(12) United States Patent  
Tachiki (10) Patent No.: US 9,143,662 B2  
(45) Date of Patent: Sep. 22, 2015

(54) FRAME FASTENING STRUCTURE

(71) Applicant: PANASONIC INTELLECTUAL PROPERTY MANAGEMENT CO., LTD., Osaka-shi, Osaka (JP)

(72) Inventor: Kouji Tachiki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 184 days.

(21) Appl. No.: 13/742,366

(22) Filed: Jan. 16, 2013

(65) Prior Publication Data

US 2014/0078385 A1 Mar. 20, 2014

(30) Foreign Application Priority Data

Sep. 14, 2012 (JP) ................................. 2012-202566  
Dec. 25, 2012 (JP) ................................. 2012-280970

(51) Int. Cl.  
*H04N 5/225* (2006.01)

(52) U.S. Cl.  
CPC .................................. *H04N 5/2252* (2013.01)

(58) Field of Classification Search  
CPC ............. H04N 5/2251–5/2254; H04N 5/2257; G03B 2217/00  
USPC .................................................. 348/373–376  
See application file for complete search history.

(56) References Cited

U.S. PATENT DOCUMENTS

| 2006/0082680 | A1* | 4/2006 | Lee ................................ 348/372 |
| 2010/0129139 | A1* | 5/2010 | Suzuki et al. ................... 403/24 |
| 2011/0247861 | A1* | 10/2011 | Hwang et al. .................. 174/252 |
| 2012/0242786 | A1* | 9/2012 | Sasagawa et al. ............... 348/36 |

FOREIGN PATENT DOCUMENTS

| JP | S58-038857 Y2 | 9/1983 |
| JP | H5-154664 A | 6/1993 |
| JP | H6-057828 A | 3/1994 |
| JP | H6-123306 A | 5/1994 |
| JP | H10-102596 A | 4/1998 |
| JP | 2006-009471 A | 1/2006 |
| JP | 2007-284907 A | 11/2007 |

* cited by examiner

*Primary Examiner* — Roberto Velez  
*Assistant Examiner* — Tuan Le  
(74) *Attorney, Agent, or Firm* — Shinjyu Global IP (57) ABSTRACT

The present invention relates to a housing for an imaging device, and more particularly to a frame fastening structure, and provides a frame fastening structure with a thinner fastening portion. This frame fastening structure comprises a first frame, a second frame that is screwed to the first frame, bosses that are provided on either the first frame side or the second frame side, and holes provided on the other side into which the bosses are fitted. The center positions are offset when the bosses and holes are mated, which imparts a force in the direction of pulling the first frame and second frame together, and the layout is such that the fastening direction of the second frame is substantially perpendicular to the screw fastening direction.

6 Claims, 7 Drawing Sheets

FRAME FASTENING STRUCTURE

CROSS-REFERENCE TO RELATED APPLICATIONS

This application claims priority under 35 U.S.C. §119 to Japanese Patent Application No. 2012-202566 filed on Sep. 14, 2012 and Japanese Patent Application No. 2012-280970 filed on Dec. 25, 2012. The entire disclosure of Japanese Patent Application No. 2012-202566 and Japanese Patent Application No. 2012-280970 is hereby incorporated herein by reference.

BACKGROUND

1. Field of the Invention

This disclosure relates to a housing for an imaging device, and more particularly to a frame fastening structure.

2. Description of the Related Art

There have been proposals in the past for a frame structure having a screw fastening direction that is different from the part fastening direction, in which the fastening is done with screws from a part side face.

For example, Japanese Laid-Open Patent Application 2006-9471 discloses a configuration in which the lower end face of an upper column and the upper end face of a lower column are inclined faces that are parallel to each other and are oblique to their center axes, and a bolt linking means is provided that pulls the upper column and the lower column together, in a direction that is at a right angle to their axes, from a state in which the upper part along the inclined lower end face of the upper column is butted against the lower part along the inclined upper end face of the lower column, to a position where the center axes coincide. With this configuration, in an integrated state in which that the center axes of the upper column and the lower column coincide, these columns constitute a temporary column of a specific height.

Thus, with the conventional frame fastening structure disclosed in the above-mentioned publication, fastening is performed with screws from a part side face, which makes it possible to fasten frames having a screw fastening direction that is different from the part fastening direction.

SUMMARY

However, with the conventional frame fastening structure disclosed in the above publication, because the upper and lower columns are pulled together, in a direction that is at a right angle to their axes, from a state in which the upper part along the inclined lower end face of the upper column is butted against the lower part along the inclined upper end face of the lower column, to a position where the center axes coincide, a problem was that the part fastening portion ends up being thick.

In view of this, it is an object of this disclosure to provide a frame fastening structure with a thinner fastening portion, in order to solve the problems encountered with the above-mentioned prior art.

To achieve the stated object, the frame fastening structure disclosed herein comprises a first frame, a second frame, bosses, holes, and a pull-in mechanism. The second frame is screwed to the first frame in a direction that is substantially perpendicular to the fastening direction of the first and second frames. The bosses are provided on the first frame side or the second frame side. The holes are provided on the second frame side or on the first frame side, mate with the bosses, and are disposed with their center position offset with respect to the bosses in a state in which the first and second frames are fastened. The pull-in mechanism produces a force in the direction in which the first and second frames pull on each other by the elastic force of the first frame or the second frame when the holes ride up over the boss portion as a result of the center positions of the bosses and the holes being offset when these mate.

With the above configuration, a frame fastening structure with a thinner fastening portion can be provided.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Embodiment 1

Figure 1:
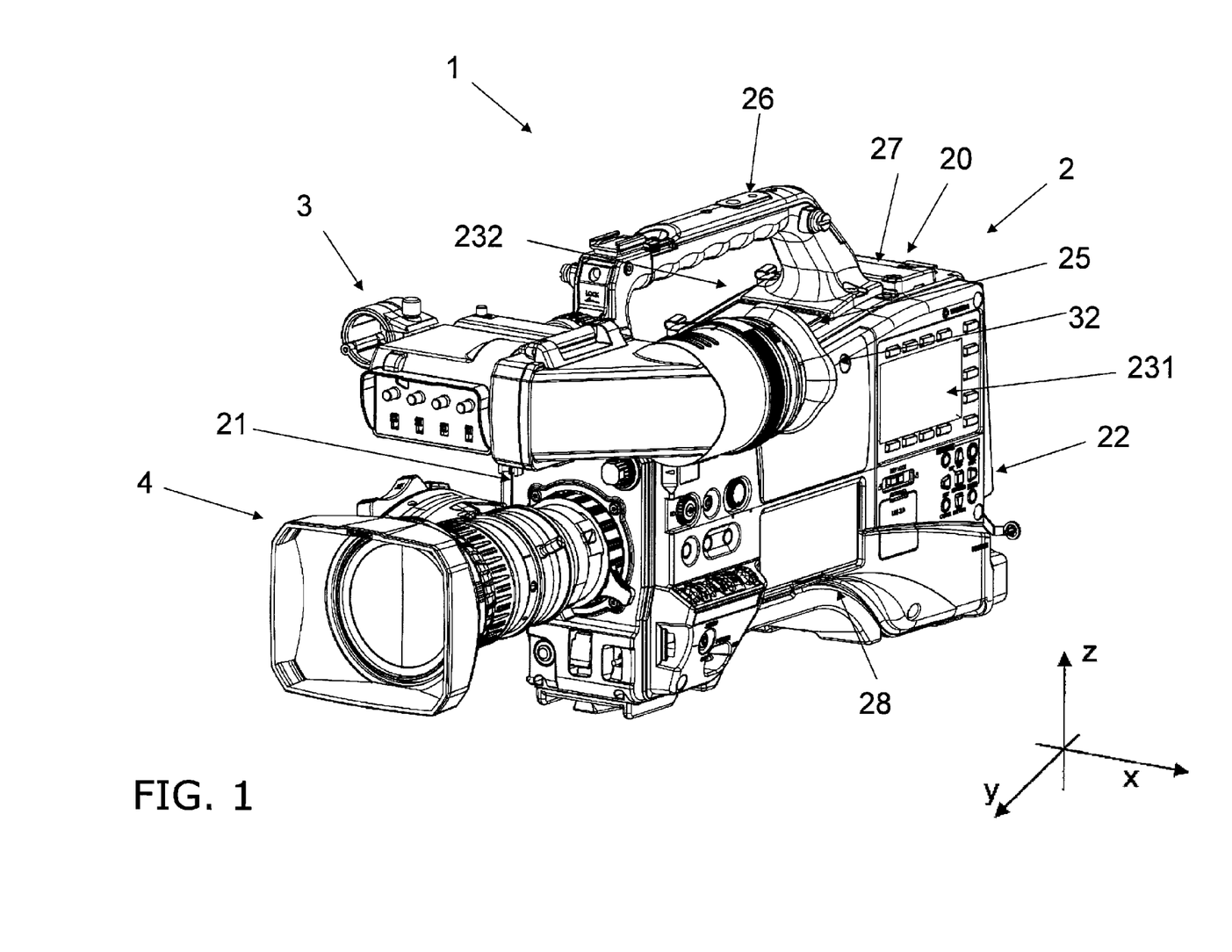
FIG. 1 is an oblique view of an imaging device featuring the frame fastening structure pertaining to Embodiment 1.

FIG. 1 is an oblique view of an imaging device 1 in this embodiment, and shows the front face, left face, and upper face of the imaging device.

In this application, the terms indicating directions such as "front", "rear", "upper", "lower", "right", "left" and "side" refer to directions seen by the user (that is, a person looking through a viewfinder 32) during normal use of the imaging device 1. In the drawings, the lateral (left and right) direction will be indicated with an arrow as the X axis direction, the forward and backward direction as the Y axis direction, and the up and down direction as the Z axis direction.

As shown in FIG. 1, the imaging device 1 comprises a main body (housing) 2, an EVF 3, and a lens 4.

As shown in FIG. 1, the main body (housing) 2 has an overall cuboid shape. The main body (housing) 2 comprises a first frame 20, a front panel 21, a second frame 22, a left side panel 231, a right side panel 232, a top cover 25, a handle 26, a receiver cover 27, a shoulder pad 28, and so forth.

The front panel 21 is disposed on the front face of the first frame 20. The second frame 22 is disposed to the rear of and under the first frame 20. The left side panel 231 is disposed on the left side of the first frame 20. The right side panel 232 is disposed on the right side of the first frame 20. The top cover 25, the handle 26, and the receiver cover 27 are disposed on the upper face of the first frame 20. The shoulder pad 28 is disposed on the lower face of the first frame 20.

The structure of the main body (housing) 2 will now be described in detail through reference to FIG. 2, etc.

Figure 2:
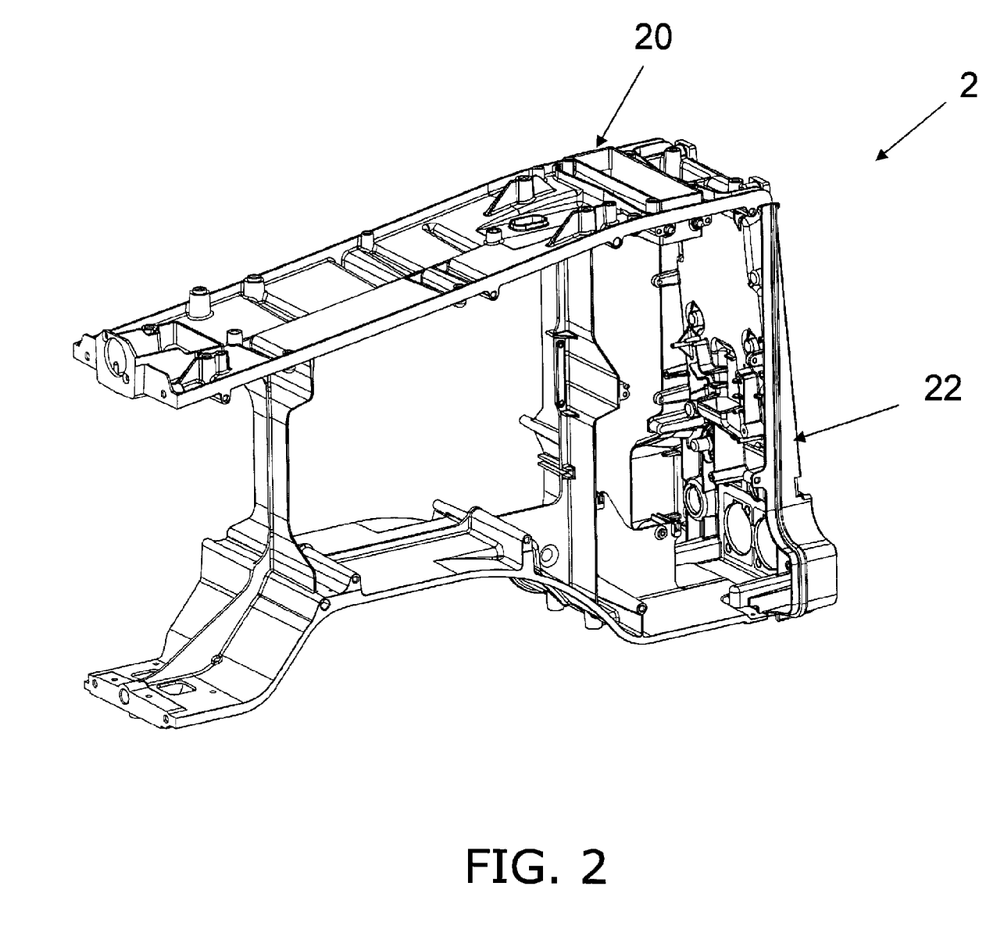
FIG. 2 is an oblique view of the fastened state of the main body of the imaging device in FIG. 1.

FIG. 2 is an oblique view of the frame fastened state of the main body (housing) 2, and shows the front face, left face, and upper face of the imaging device 1.

As shown in FIG. 2, the frame fastening structure of the main body (housing) 2 comprises the first frame 20 and the second frame 22 that is disposed under and to the rear of the first frame 20.

Figure 3:
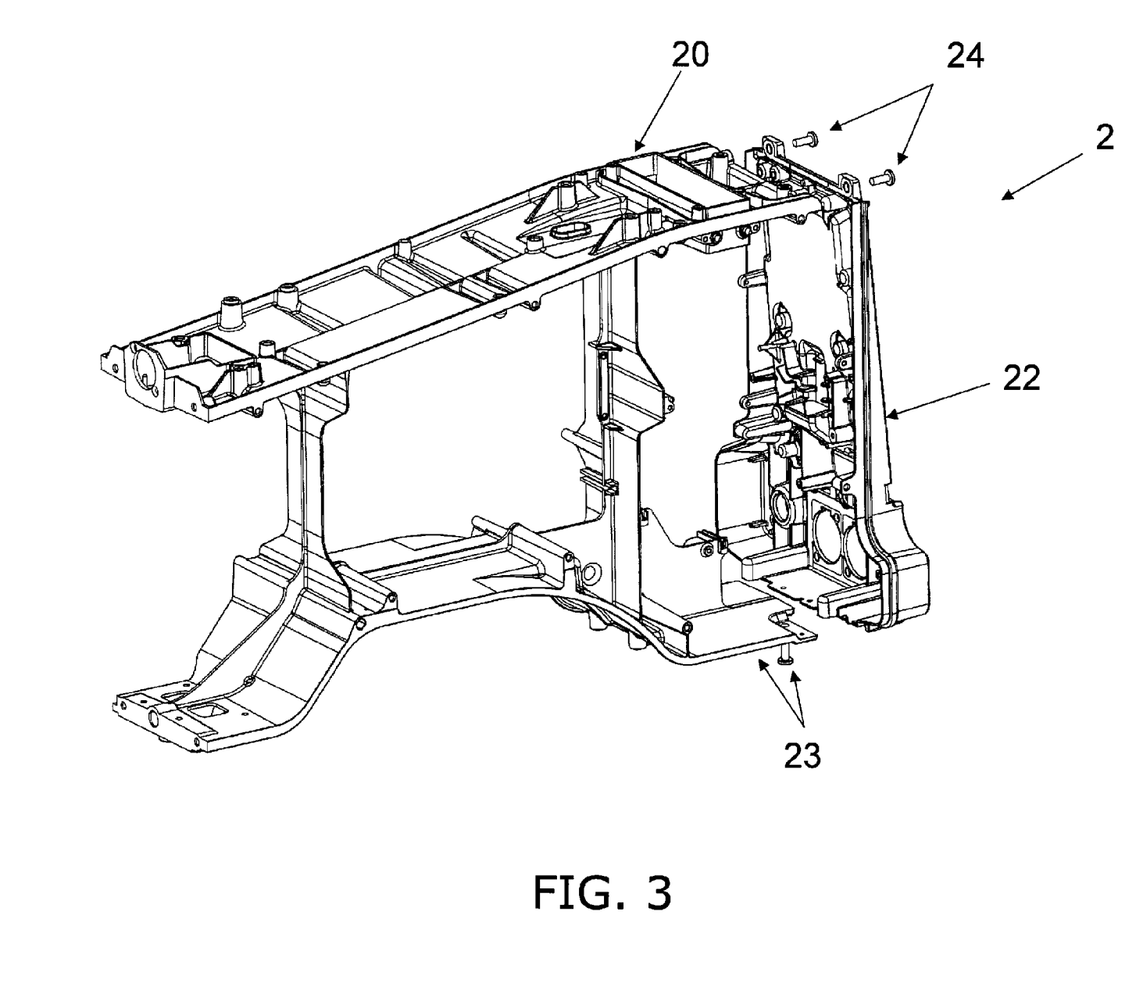
FIG. 3 is an oblique view of the fastening correspondence for the parts of the main body of the imaging device in FIG. 1.

FIG. 3 is an oblique view of the state prior to using screws to fasten the first frame 20 and the second frame 22 that is disposed to the rear of the first frame 20, and shows the front face, left face, and upper face of the imaging device.

The first frame 20 and the second frame 22 are formed as a unit overall. There are no particular restrictions on the materials of the first frame 20 and the second frame 22, but it is preferable to use a metal such as a magnesium alloy or an aluminum alloy, or a conductive resin containing carbon fibers.

Various members (not shown) that are used for imaging, such as optical members, control devices (CPU, RAM, ROM, etc.), and the like, are installed in the main body (housing) 2.

Figure 4:
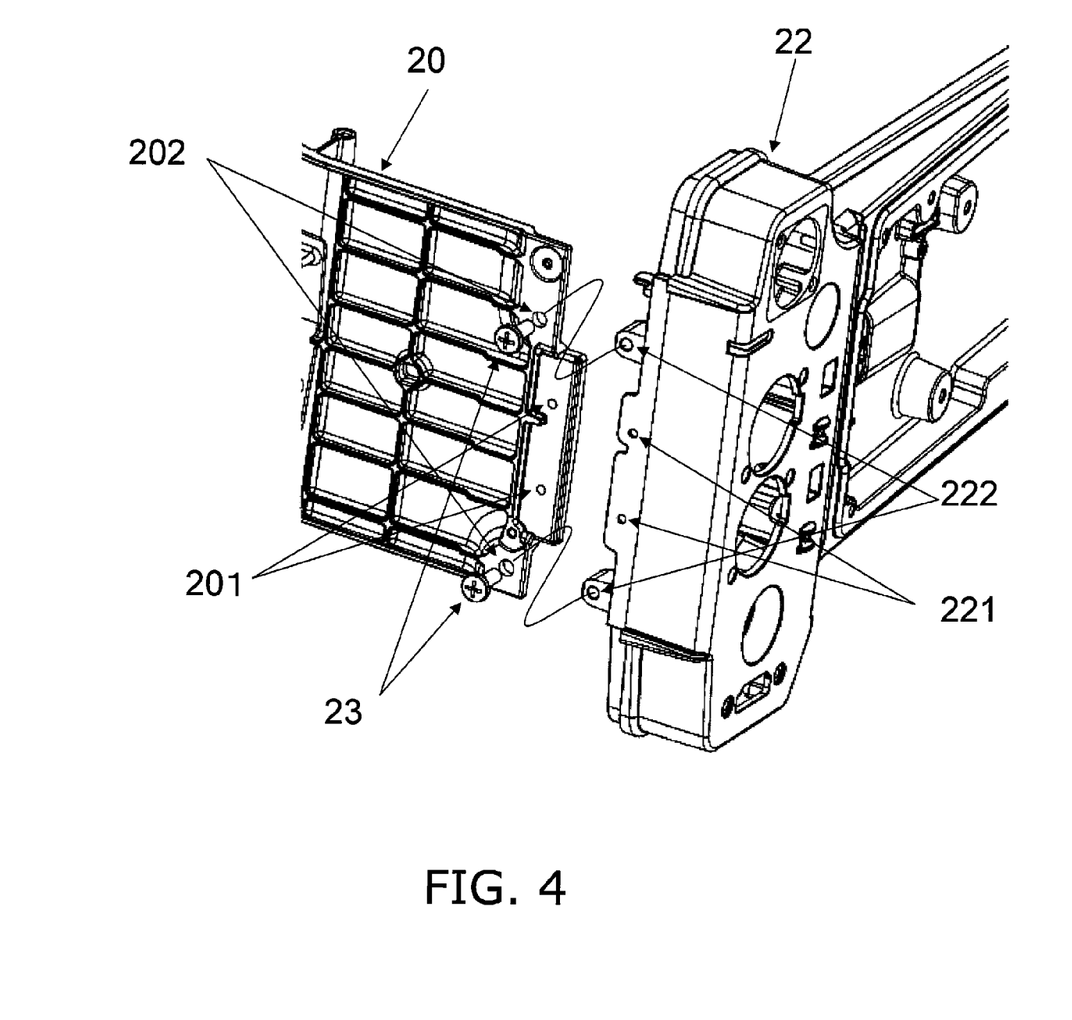
FIG. 4 is an oblique view of the fastening method for the lower part of the main body of the imaging device in FIG. 1.

FIG. 4 is an oblique view of FIG. 3 as seen from the lower rear, and shows the fastening method when the lower parts where the first frame 20 and the second frame 22 are linked are seen from the bottom face side.

Screw holes 202 that pass through in the up and down direction in the orientation of FIG. 1 are provided on the bottom face side of the first frame 20. Threaded holes 222 that open downward in the orientation in FIG. 1 are made on the bottom face side of the second frame 22.

Screws 23 are then used to fasten the first and second frames 20 and 22 so that the fastening direction of the second frame 22 with respect to the first frame 20 (the Y axis direction) is substantially perpendicular to the screw fastening direction (Z axis direction).

Figure 5:
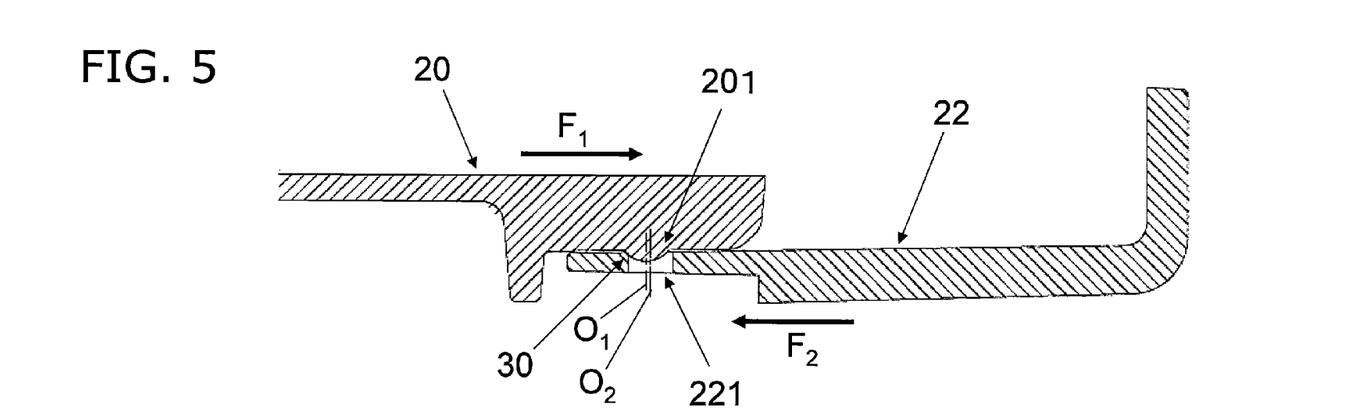
FIG. 5 is a detail cross section of the boss mating part of the lower part of the main body of the imaging device in FIG. 1.

FIG. 5 is a detail cross section of the state when bosses 201 of the first frame 20 have been fitted into holes 221 on the second frame 22 side.

The bosses 201 are provided to the first frame 20. The holes 221 with which the bosses 201 mate are provided to the second frame 22.

As shown in FIG. 5, the frame fastening structure of this embodiment comprises a pull-in mechanism 30 for imparting a force in the direction in which the first and second frames 20 and 22 pull on each other.

Specifically, with the frame fastening structure of this embodiment, as shown in FIG. 5, the center positions $O_1$ and $O_2$ are offset when the bosses 201 and the holes 221 are mated. Consequently, as shown in FIG. 5, in a state in which the second frame 22 have been aligned with the first frame 20, the elastic force of the second frame 22 produces pull-in forces $F_1$ and $F_2$ when the holes 221 of the second frame 22 ride up over the bosses 201 of the first frame 20. Accordingly, $F_1$ and $F_2$ are exerted in the direction in which the first frame 20 and the second frame 22 are pulled together. With this configuration, temporary fastening work can be carried out more easily during assembly work. As a result, assembly requires fewer steps and the total cost can be cut.

Figure 6:
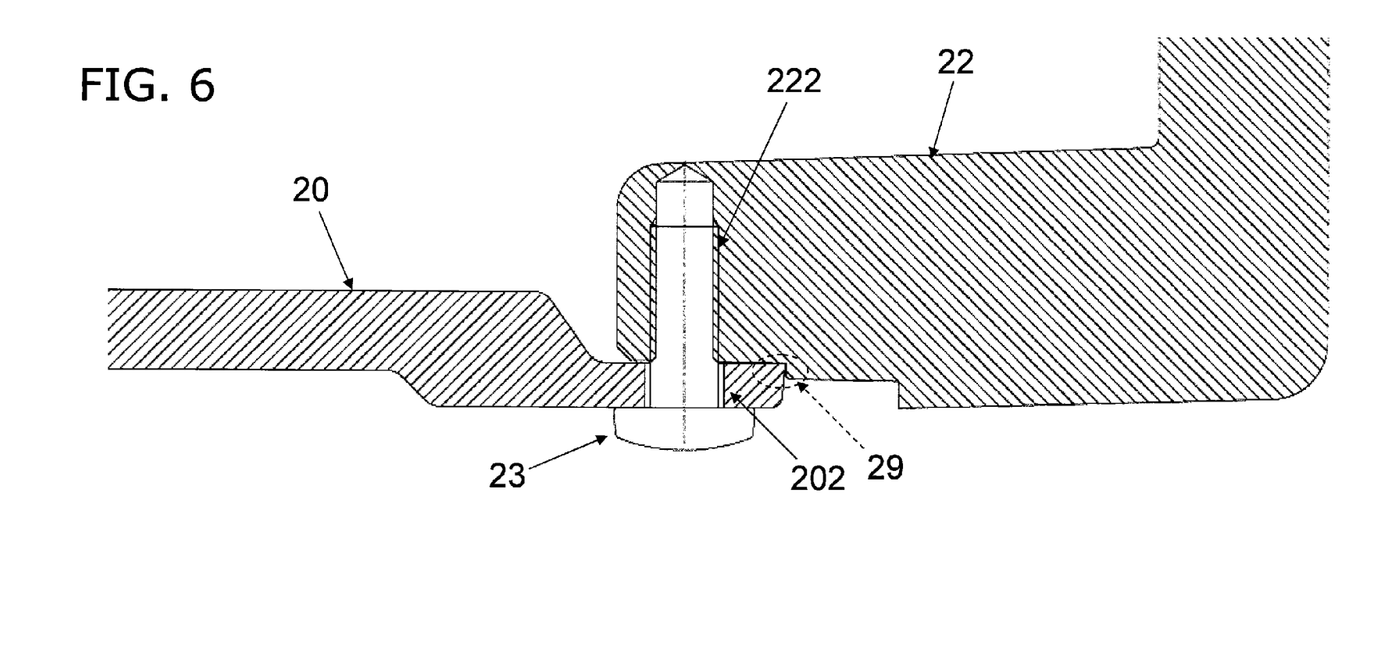
FIG. 6 is a detail cross section of the screw fastening part of the lower part of the main body of the imaging device in FIG. 1.

The reason the center positions $O_1$ and $O_2$ are disposed at offset positions when the bosses 201 and the holes 221 are mated is that movement of the first and second frames 20 and 22 is restricted in the Y axis direction by a stopper structure 29 shown in FIG. 6.

As shown in FIG. 6, the stopper structure 29 is designed so that the end of the first frame 20 hits a stepped portion of the second frame 22, which restricts movement of the first and second frames 20 and 22 in one direction in the Y axis direction.

FIG. 6 is a detail cross section of the screw fastening portion of the first and second frames 20 and 22.

As shown in FIGS. 4 and 6, the portion where the bosses 201 and the holes 221 are mated, and the fastening portion where the screws 23 are threaded through the screw holes 202 and into the threaded holes 222 are mated such that the first frame 20 and the second frame 22 are vertically staggered and mated.

The phrase "the first frame 20 and the second frame 22 are vertically staggered and mated" here means that the second frame 22 is disposed so as to cover the first frame 20 at the portion where the bosses 201 and the holes 221 are mated (shown in FIG. 5), whereas the first frame 20 is disposed so as to cover the second frame 22 at the fastening portion where the screws 23 are threaded through the screw holes 202 and into the threaded holes 222 (shown in FIG. 6).

As mentioned above, with the imaging device 1 in this embodiment, as shown in FIG. 5, the configuration is such that the center position $O_1$ of the bosses 201 on the first frame 20 side and the center position $O_2$ of the holes 221 on the second frame 22 side are disposed at offset positions in the fastened state of the first and second frames 20 and 22.

Consequently, as shown in FIG. 5, in the fastened state of the first and second frames 20 and 22, the center positions $O_1$ and $O_2$ are offset when the bosses 201 and the holes 221 are mated, and consequently the forces $F_1$ and $F_2$ are can be produced by the elastic force of the second frame 22 when the holes 221 of the second frame 22 ride up over the bosses 201 of the first frame 20. Thus, the forces $F_1$ and $F_2$ are produced that pull the first frame 20 and the second frame 22 toward each other in the fastening direction (Y axis direction).

As a result, the portion having the function of pulling in the first and second frames 20 and 22 toward each other is provided separately from the portion having the function of fastening the first and second frames 20 and 22 together, so the fastening portion of the first and second frames 20 and 22 can be thinner than with a conventional configuration in which the fastening of parts perpendicular to the fastening direction of the parts splits the force in the axial direction of the screws.

Modification Example of Embodiment 1

Embodiment 1 was given as an example of this disclosure, but this disclosure is not limited to this embodiment. Other embodiments of this disclosure will be described below. This disclosure is not limited to or by these other embodiments, and can also be applied to suitably modified embodiments.

In Embodiment 1 above, the configuration was such that the first frame 20 and the second frame 22 were vertically staggered and mated at the portion where the bosses 201 and the holes 221 mated (shown in FIG. 5), and the fastening portion where the screws 23 were threaded through the screw holes 202 and into the threaded holes 222 (shown in FIG. 6), but this is not the only option.

For example, the configuration may be such that the mating components where the first frame and second frame mate are not vertically staggered and mated. In other words, the configuration may be such that the boss mating direction and the screw fastening direction are substantially perpendicular to the part fastening direction.

However, if the mating components where the first frame and second frame mate are vertically staggered and mated as in Embodiment 1 above, the center positions will be offset when the bosses and holes are mated, and this will increase the forces $F_1$ and $F_2$ exerted in the direction of pulling the first frame and second frame toward each other. Thus, the temporary fastening of the first frame and second frame will be more effective.

Also, when a metal such as a magnesium alloy or an aluminum alloy, or a conductive resin containing carbon fibers or the like is used as the material of the first and second frames, the first frame 20 and the second frame 22 can be fitted more snugly together by the forces $F_1$ and $F_2$ exerted in the direction of pulling the first frame 20 and the second frame 22 toward each other, so electromagnetic compatibility (EMC) can be ensured.

Embodiment 2

Figure 7:
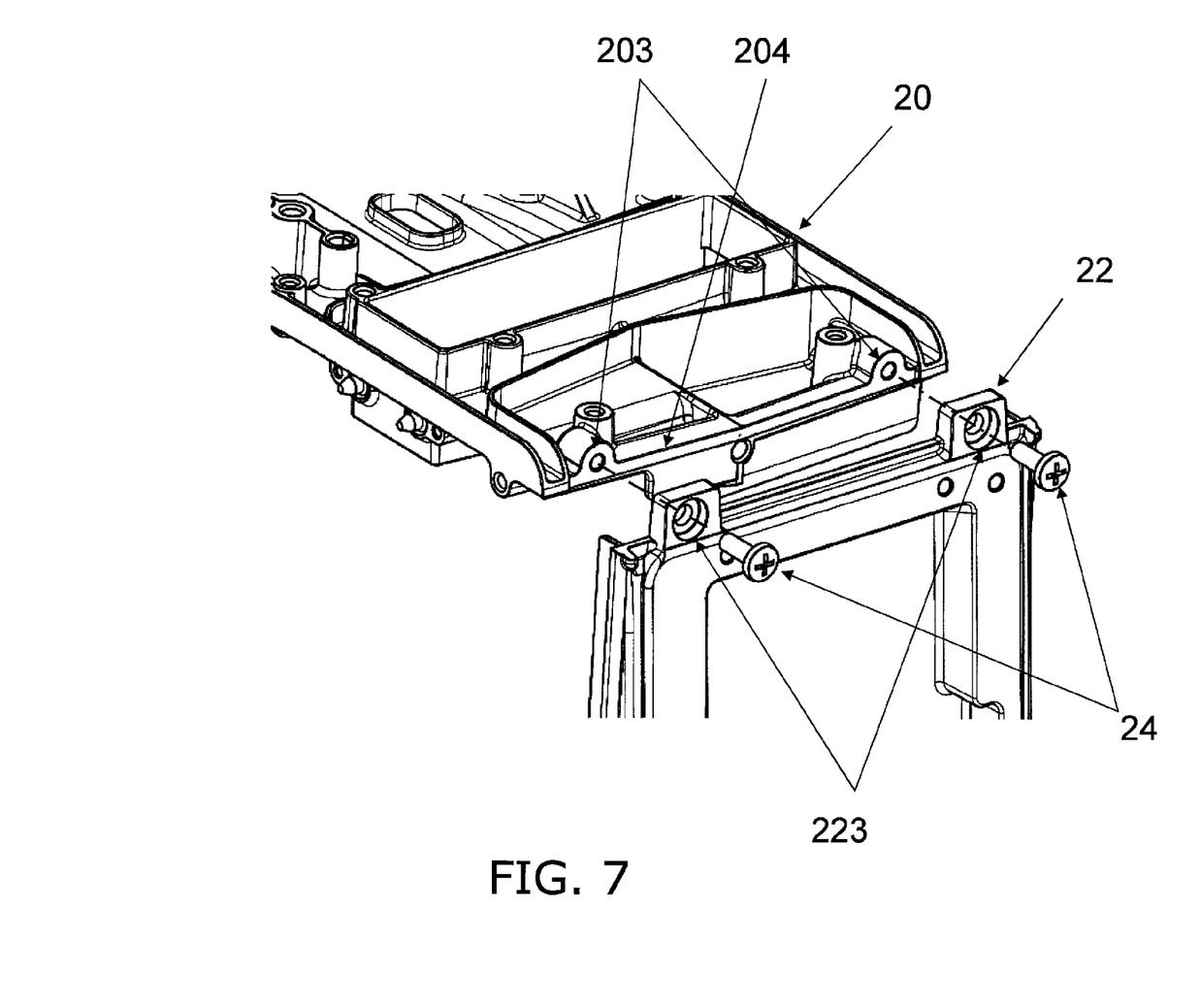
FIG. 7 is an oblique view of the fastening method for the upper part of the main body of the imaging device pertaining to Embodiment 2.
Figure 8:
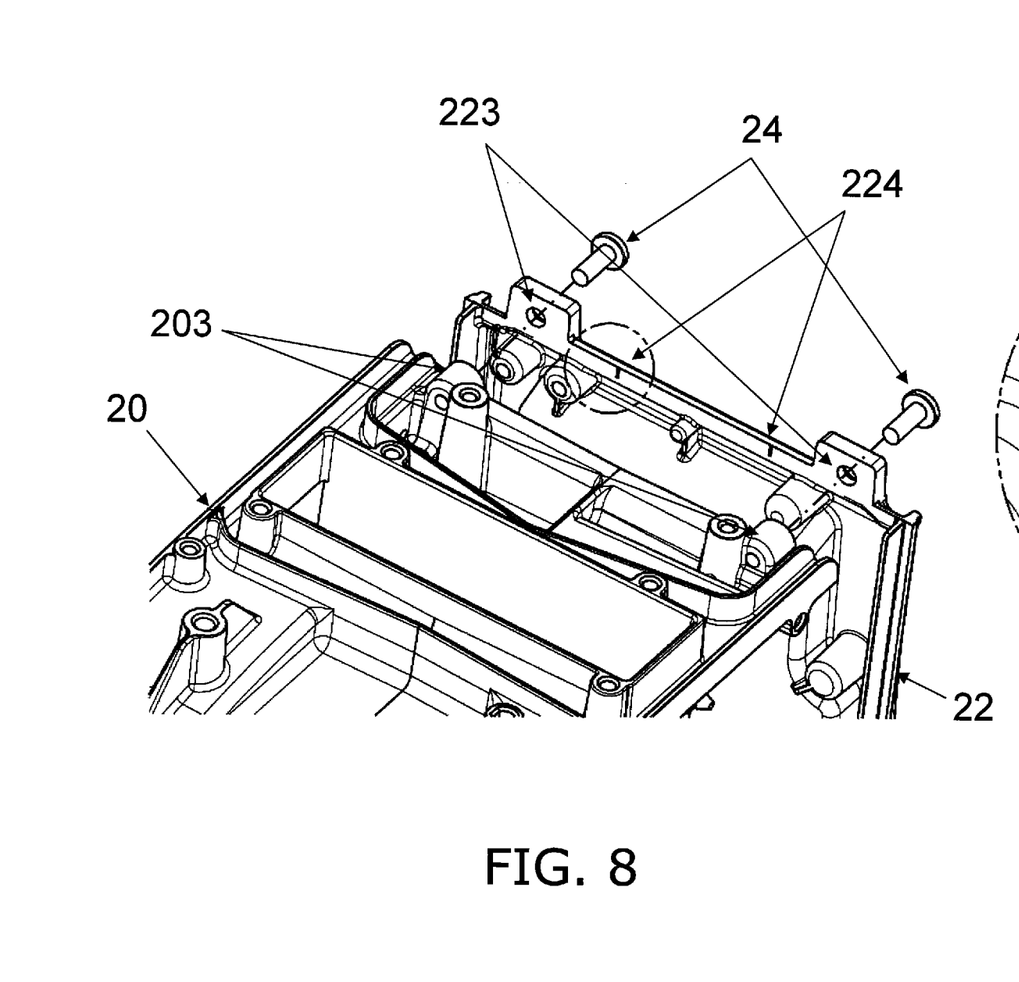
FIG. 8 is an oblique view of the rib-like protrusions of the upper part of the main body of the imaging device in FIG. 7.

FIG. 7 is an oblique view of FIG. 3 as seen from the upper rear. FIG. 8 is an oblique view of rib-like protrusions provided to the upper-rear part in FIG. 3, and shows the method for fastening the upper parts of the first frame 20 and the second frame 22.

The first frame 20 has threaded holes 203 and an attachment face 204 on the side where the second frame 22 is fastened. The second frame 22 has screw holes 223 and rib-like protrusions 224 (each provided at a position adjacent to and on the left or right of a screw hole 223) on the side where the first frame 20 is fastened. These are used to fasten with screws 24 in the fastening direction of the second frame (Y axis direction).

Figure 9:
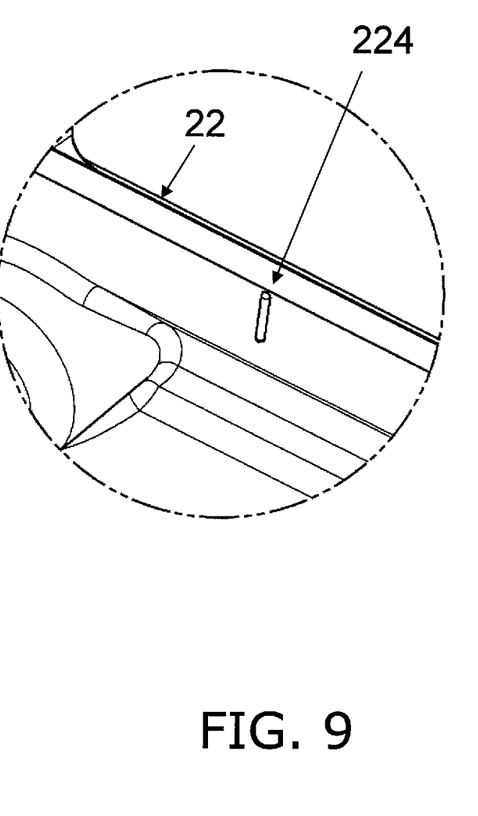
FIG. 9 is an enlarged view of the rib-like protrusions of the upper part of the main body of the imaging device in FIG. 7.

FIG. 9 is a detail oblique view of the portion in the two-dot chain line circle where the rib-like protrusion 224 is formed on the second frame in FIG. 8.

With this configuration, axial force when the screws 24 are tightened brings the rib-like protrusions 224 into contact with the attachment face 204.

Consequently, when the material of the first frame 20 and the second frame 22 is a metal such as a magnesium alloy or an aluminum alloy, or a conductive resin containing carbon fibers or the like, electrical connection will be ensured with the rib-like protrusions 224, so electromagnetic compatibility (EMC) can be ensured.

Modification Example of Embodiment 2

Embodiment 2 was given as an example of this disclosure, but this disclosure is not limited to this embodiment. Other embodiments of this disclosure will be described below. This disclosure is not limited to or by these other embodiments, and can also be applied to suitably modified embodiments.

In this embodiment, one rib-like protrusion 224 was provided adjacent to each of the screw holes, but the present disclosure is not limited to this.

For example, two of the rib-like protrusions 224 may be provided adjacent to each of the screw holes. In other words, if we let n be the number of screw holes used for screw fastening (n is a natural number of at least 2), then the number m of rib-like protrusions has the relation $1 \leq m \leq 2n$, and there may be one or two rib-like protrusions between adjacent screw holes.

Therefore, if a rib-like protrusion is provided at one location adjacent to each screw hole, then the rib-like protrusions disposed adjacent to the screw holes can be reliably brought into contact with the attachment face 204. As a result, if the first and second frames are made from a metal such as a magnesium alloy or an aluminum alloy, or a conductive resin containing carbon fibers or the like, electrical connection will be ensured with the rib-like protrusions, and electromagnetic compatibility (EMC) can be ensured.

Other Modification Examples

In Embodiments 1 and 2 above, an example was described of applying the frame fastening structure pertaining to this disclosure to frame members (first and second frames 20 and 22) of the imaging device 1, but this disclosure is not limited to this.

For example, this disclosure can of course also be applied to various kinds of frame fastening structure used in devices other than imaging devices.

INDUSTRIAL APPLICABILITY

This disclosure relates to the housing of an imaging device, and more particularly to a frame fastening structure, and provides a frame fastening structure with a thinner fastening portion, and therefore can be applied not only to the housings of imaging devices, but also to frame fastening structures for the housings of other devices.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the frame fastening structure. Accordingly, these terms, as utilized to describe the technology disclosed herein should be interpreted relative to the frame fastening structure.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A frame fastening structure, comprising:
    a first frame;
    a second frame screwed to the first frame in a direction that is substantially perpendicular to a fastening direction of the first and second frames;
    a plurality of bosses provided on a first frame side or a second frame side;
    a plurality of through-holes provided on the second frame side or on the first frame side, that mate with the bosses, and that are disposed with their center position offset with respect to the bosses in a state in which the first and second frames are fastened wherein the bosses do not extend completely through the through-holes; and
    a pull-in mechanism that produces a force in the direction in which the first and second frames pull on each other by the elastic force of the first frame, or the second frame, when the through-holes ride up over the boss portion as a result of the center positions of the bosses and the through-holes being offset when these mate.

2. The frame fastening structure according to claim 1, wherein, a force is exerted in the direction in which the first frame and the second frame are pulled together when screwed tight as a result of the center positions of the bosses and the through-holes being offset to one another in the fastening of the first and second frames when the first and second frames are fastened each other.

3. The frame fastening structure according to claim 1, wherein the first frame and the second frame are vertically staggered and mated at the portions where the bosses and the through-holes mate and the fastened portions where the first frame and the second frame are screwed together.

4. The frame fastening structure according to claim 3, wherein the first frame and the second frame are electroconductive members.

5. The frame fastening structure according to claim 1, further comprising:
    a stopper structure that restricts movement of the first and second frames in the fastening direction of the first and the second frames when the bosses and the through-holes are mated.

6. The frame fastening structure according to claim 1, further comprising:
    in the plurality of through-holes, each through-hole has a left hole edge and a right hole edge and a hole center position located equidistant between the left hole edge and the right hole edge; and
    in the plurality of bosses, each boss has a left boss edge and a right boss edge and a boss center position located equidistant between the left boss edge and the right boss edge;
    such that when the plurality of through-holes are mated with the plurality of bosses, the hole center position of each hole is offset from with the boss center position of each boss with which it is mated.

* * * * *